United States Patent
Lawrence et al.

(10) Patent No.: US 10,226,985 B2
(45) Date of Patent: Mar. 12, 2019

(54) DEVICE AND METHOD FOR ENHANCING HEAT EXCHANGER AIRFLOW

(71) Applicant: THERMO KING CORPORATION, Minneapolis, MN (US)

(72) Inventors: Wilson Samuel Jesudason Lawrence, Bangalore (IN); David John Dykes, Eagan, MN (US); Abhijith Balakrishna, Bangalore (IN); Christopher Thomas Arneson, New Market, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 299 days.

(21) Appl. No.: 14/653,696

(22) PCT Filed: Dec. 31, 2013

(86) PCT No.: PCT/US2013/078536
§ 371 (c)(1),
(2) Date: Jun. 18, 2015

(87) PCT Pub. No.: WO2014/106264
PCT Pub. Date: Jul. 3, 2014

(65) Prior Publication Data
US 2015/0343941 A1    Dec. 3, 2015

Related U.S. Application Data (60) Provisional application No. 61/781,903, filed on Mar. 14, 2013, provisional application No. 61/747,856, filed on Dec. 31, 2012.

(51) Int. Cl.
*B60P 3/20* (2006.01)
*B60H 1/32* (2006.01)
*B62D 35/00* (2006.01)

(52) U.S. Cl.
CPC ......... *B60H 1/3232* (2013.01); *B60H 1/3229* (2013.01); *B60P 3/20* (2013.01); *B62D 35/001* (2013.01)

(58) Field of Classification Search
CPC ...... B60H 1/3232; B60H 1/3229; B60H 1/32; B60P 3/20; B26D 35/001; B62D 35/002; B62D 37/07; B62D 35/00
(Continued)

(56) References Cited

U.S. PATENT DOCUMENTS

| 3,163,995 A | 1/1965 | Maier |
| 3,738,621 A * | 6/1973 | Anderson ............ B60H 1/3202 |
| | | 261/105 |

(Continued)

FOREIGN PATENT DOCUMENTS

| CN | 2385914 | 7/2000 |
| CN | 2880564 | 3/2007 |

(Continued)

OTHER PUBLICATIONS

Chinese Office Action issued in corresponding Chinese Application No. 201380074160.4 dated Aug. 29, 2016 (13 pages).

(Continued)

*Primary Examiner* — Gregory Huson
*Assistant Examiner* — Ryan Faulkner
(74) *Attorney, Agent, or Firm* — Hamre, Schumann, Mueller & Larson, P.C.

(57) ABSTRACT

Devices and methods for enhancing heat exchanger airflow in a transport refrigeration system (TRS) of a refrigerated transport unit are provided. In particular, a fairing is provided on a top surface of a TRU to shield the TRU from an adverse effect of wind (e.g., ram air) and build a negative pressure at a heat exchanger fan delivery side of the TRU. The angle, shape and height of the fairing can be optimized (Continued)

to achieve a desired heat exchanger airflow through condenser coil(s), a radiator and/or intercooler of the TRU during operation.

20 Claims, 10 Drawing Sheets

(58) Field of Classification Search
USPC .......................................................... 454/91
See application file for complete search history.

(56) References Cited

U.S. PATENT DOCUMENTS

| | | | |
|---|---|---|---|
| 3,934,922 | A | 1/1976 | MacCready, Jr. et al. |
| 4,018,472 | A * | 4/1977 | Mason, Jr. ........... B62D 35/001 |
| | | | 105/1.2 |
| 4,078,395 | A | 3/1978 | Crowe et al. |
| 4,310,192 | A | 1/1982 | Fitzgerald |
| 4,468,060 | A * | 8/1984 | FitzGerald ........... B62D 35/001 |
| | | | 296/180.4 |
| 4,567,734 | A | 2/1986 | Dankowski |
| 4,956,978 | A | 9/1990 | Bleck et al. |
| 5,317,880 | A | 6/1994 | Spears |
| 5,443,113 | A | 8/1995 | Mulholland et al. |
| 5,916,253 | A | 6/1999 | Amr et al. |
| 5,927,090 | A | 7/1999 | Ladendorf et al. |
| 6,422,034 | B2 | 7/2002 | Gehman et al. |
| 6,543,244 | B1 | 4/2003 | Amr |
| 6,907,747 | B2 | 6/2005 | Laizer |
| 7,455,348 | B1 | 11/2008 | Grover |
| 7,765,824 | B2 | 8/2010 | Wong et al. |
| 8,181,476 | B2 * | 5/2012 | Khan ....................... B60P 3/20 |
| | | | 62/244 |
| 2001/0035020 | A1 * | 11/2001 | Gehman .................. B60H 1/24 |
| | | | 62/244 |

FOREIGN PATENT DOCUMENTS

| | | |
|---|---|---|
| CN | 101142101 | 3/2008 |
| CN | 101384445 | 3/2009 |
| CN | 101541575 | 9/2009 |
| CN | 101934755 | 1/2011 |
| CN | 102347631 | 2/2012 |
| JP | S58188212 | 12/1983 |
| WO | 2007130065 | 11/2007 |

OTHER PUBLICATIONS

European Search Report issued in corresponding European Application No. 13868375.0 dated Feb. 3, 2017 (9 pages).
International search report for International application No. PCT/US2013/078536 dated Apr. 21, 2014 (3 pages).
Written opinion for International application No. PCT/US2013/078536 dated Apr. 21, 2014 (7 pages).
Chinese Office Action issued in co-pending Chinese Application No. 201380074160.4 dated Jun. 5, 2018 (12 pages).

\* cited by examiner

DEVICE AND METHOD FOR ENHANCING HEAT EXCHANGER AIRFLOW

FIELD

The embodiments disclosed herein relate generally to a refrigerated transport unit. More particularly, the embodiments relate to devices and methods for enhancing heat exchanger airflow in a transport refrigeration system (TRS) of a refrigerated transport unit.

BACKGROUND

A transport refrigeration system (TRS) is generally used to control an environmental condition (e.g., temperature, humidity, air quality, and the like) within a transport unit (e.g., a container on a flat car, an intermodal container, etc.), a truck, a box car, or other similar transport unit. Refrigerated transport units are commonly used to transport perishable items such as produce, frozen foods, and meat products. The refrigerated transport unit can have a controlled environmental condition (e.g., temperature, humidity, air quality, and the like) in a cargo space (conditioned space) during transport. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

The embodiments described herein are directed to a refrigerated transport unit. In particular, the embodiments described herein are directed to devices and methods for enhancing heat exchanger airflow in a TRS of a refrigerated transport unit.

The embodiments described herein provide efficient devices and methods for shielding heat exchanger (e.g., condenser, radiator, intercooler, etc.) airflow from the adverse effect of wind (e.g., ram air) and for creating and/or increasing a negative pressure at one or more heat exchanger fan outlets of a transport refrigeration unit (TRU) of the TRS.

During transport of the refrigerated transport unit, these embodiments can enhance airflow through a condenser coil, a radiator and/or an intercooler of the TRU which can prevent and/or mitigate a high engine coolant temperature and head pressure in the TRS and the accumulation of frost, or potentially lead to a TRU shutdown.

In particular, a fairing is provided at a top end of the TRU that is configured, during transport, to enhance heat exchanger airflow through the condenser coil, radiator and/or intercooler of the TRU at a level similar to a level of heat exchanger airflow when the refrigerated transport unit is not in transport. The fairing is configured to break and divert on-coming wind (e.g., ram air) so as to not pass over one or more of the heat exchanger fan outlets and is configured to create and/or increase a negative pressure downstream of the one or more heat exchanger fans. Thus, the TRU can operate at desired conditions while in transport and during a standstill condition.

Accordingly, the fairing provides a simple, cost-effective and space-efficient solution for enhancing heat exchanger airflow, reducing aerodynamic drag and increasing fuel economy of the TRS. The angle, shape, and height of the fairing can be optimized to achieve the desired airflow through the condenser coils, the radiator and/or intercooler when the refrigerated transport unit is in transport and/or travelling at high speeds (e.g., ~60 mph or faster).

In one embodiment, a fairing is provided on a top surface of a TRU to shield the TRU from an adverse effect of wind (e.g., ram air) and create and/or increase a negative pressure at a heat exchanger fan delivery side of the TRU. The angle, shape and height of the fairing can be optimized to achieve a desired heat exchanger airflow through condenser coil(s), a radiator, and/or intercooler of the TRU during operation.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein are directed to a refrigerated transport unit. More particularly, the embodiments relate to devices and methods for enhancing heat exchanger airflow in a transport refrigeration system (TRS) of a refrigerated transport unit.

As discussed herein, a "refrigerated transport unit" refers to a transport unit that includes a TRS. A "transport refrigeration system" or "TRS" is generally used to control an environmental condition within the transport unit and can include, for example, a TRU, one or more sensors disposed inside and/or outside the transport unit, a generator set, one or more remote evaporator units, etc. The "TRU" is generally attached to the transport unit and can include, for example, one or more refrigeration components (e.g., an evaporator, a condenser, a compressor, an expansion valve), one or more condenser fans, one or more evaporator fans, an engine, an alternator, a radiator, an intercooler, a TRS controller, a data logger, a human machine interface (HMI), etc. The term "ram air" refers to air/wind from the ambient passing over the TRS and being directed into a heat exchanger fan outlet.

It will be appreciated that the embodiments described herein may be used in any suitable transport unit such as a trailer (e.g., trailer on flat car, etc.), a container (e.g., container on flat cars, intermodal container, etc.), a truck, a box car, etc. The TRS may be a vapor-compressor type refrigeration system, or any other suitable refrigeration system that can use refrigerant, cold plate technology, etc.

Figure 1A:
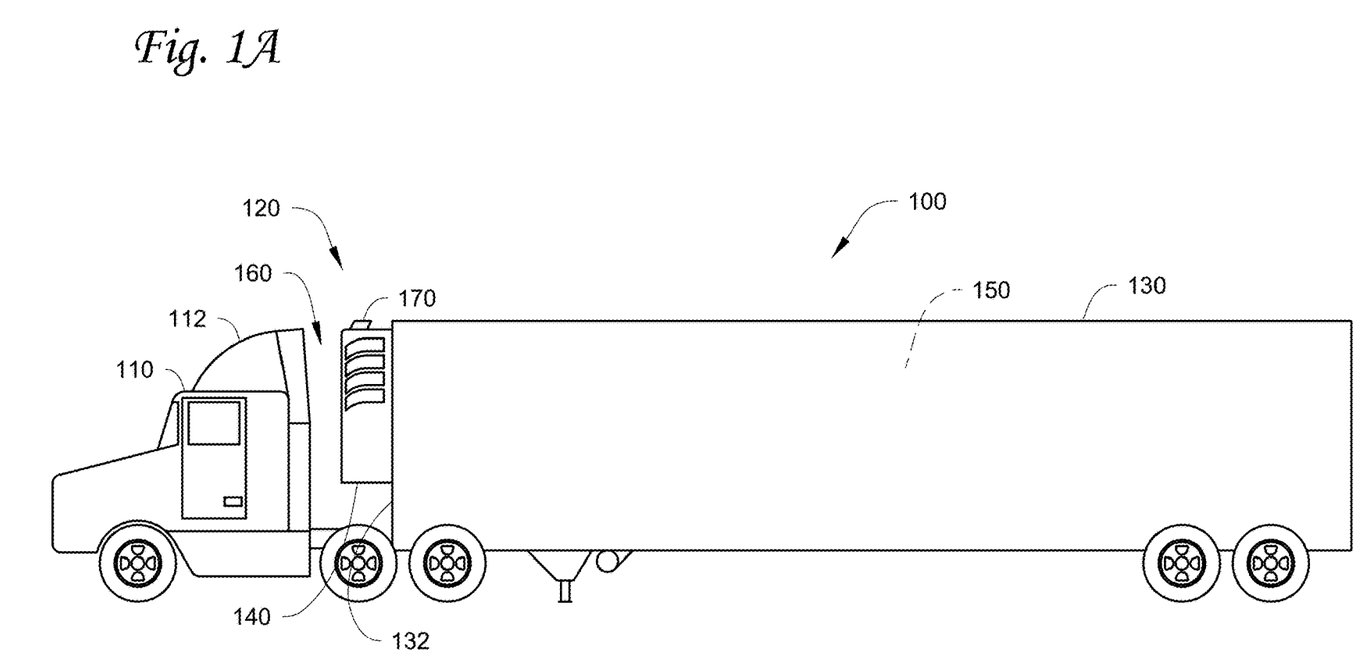
FIG. 1A illustrates a side view of a refrigerated transport unit attached to a tractor, according to one embodiment.
Figure 1B:
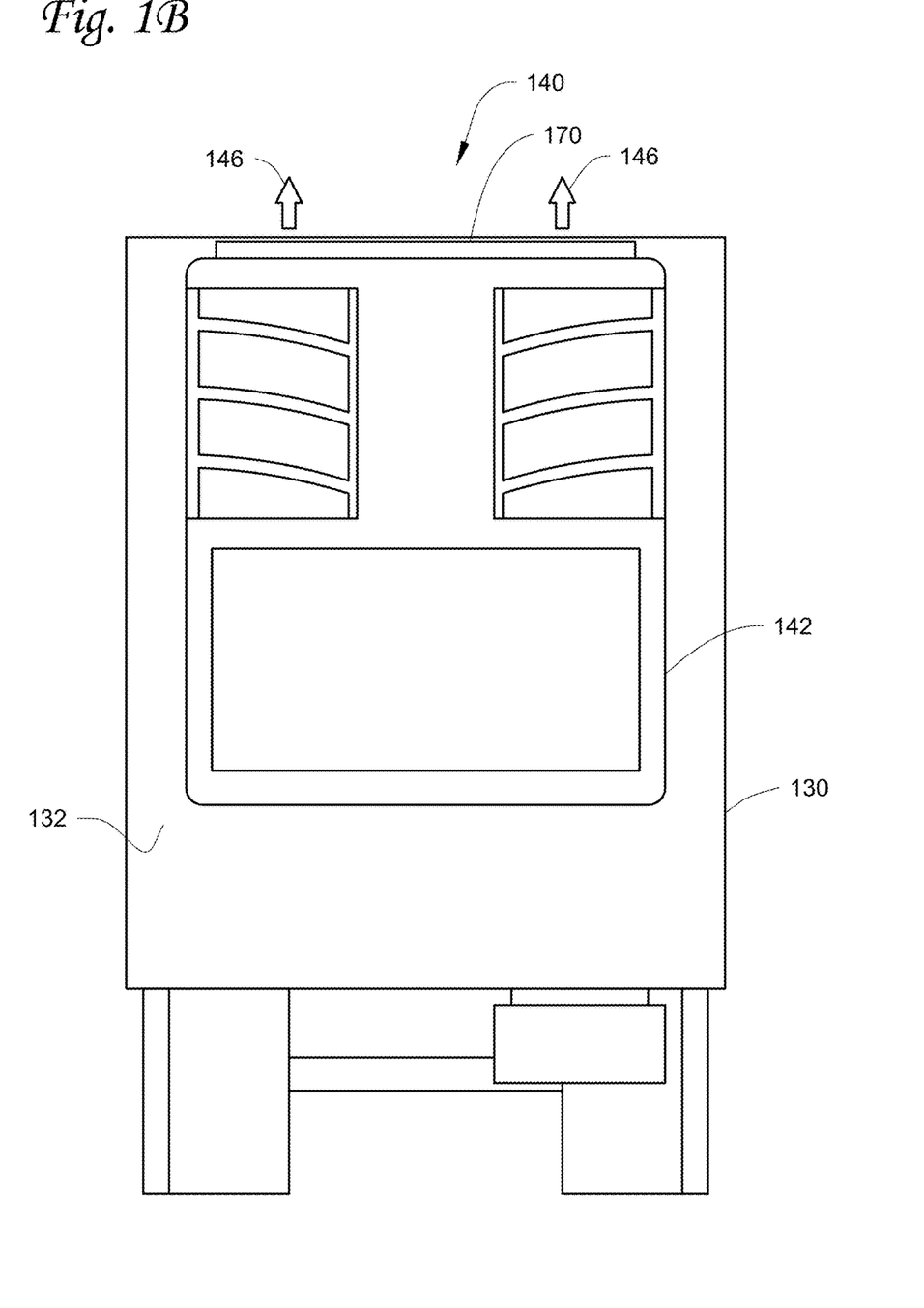
FIG. 1B illustrates a front view of the refrigerated transport unit shown in FIG. 1A, according to one embodiment.
Figure 1C:
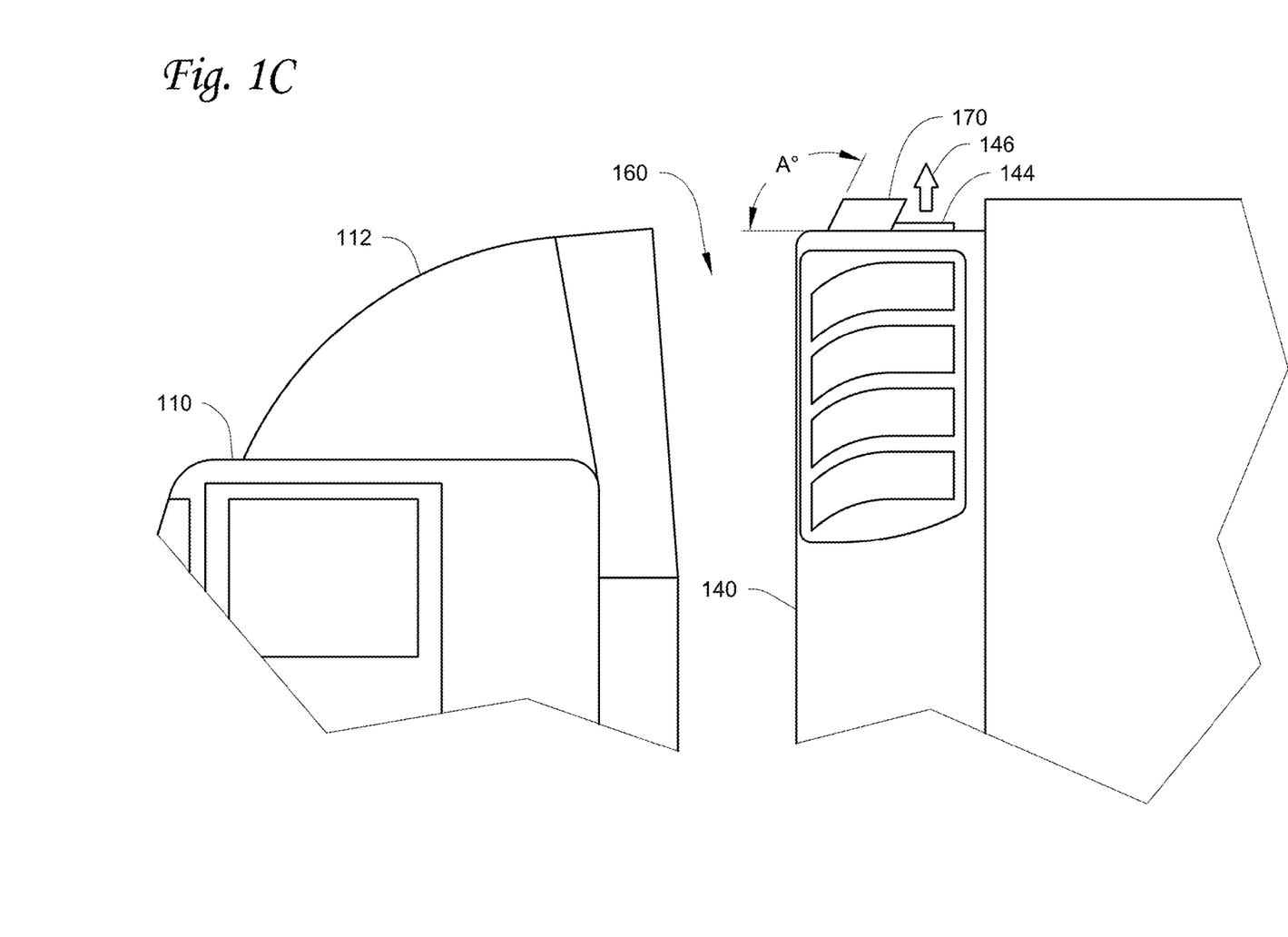
FIG. 1C illustrates a close up side view of the TRU shown in FIG. 1A, according to one embodiment.

FIGS. 1A, 1B and 1C illustrate different views of a refrigerated transport unit 100 that is towed by a tractor 110, with which the embodiments as described herein can be practiced. As shown in FIG. 1A, the refrigerated transport unit 100 includes a TRS 120 and a transport unit 130.

The TRS 120 is configured to control an environmental condition (e.g., temperature, humidity, air quality, and the like) of an internal space 150 of the transport unit 130. In some embodiments, the TRS 120 can be configured to transfer heat between an internal space 150 and the outside environment. Also, in some embodiments, the TRS 120 can be a multi-zone system in which different zones or areas of the internal space 150 are controlled to meet different refrigeration requirements based on the cargo stored in the particular zone. The TRS 120 includes a transport refrigeration unit (TRU) 140.

The transport unit 130 can be attached to and thereby towed by the tractor 110. The tractor 110 generally has a wind deflector 112 disposed on top of the tractor 110. After the transport unit 130 is attached to the tractor 110, an air gap 160 is formed between a back of the tractor 110 including the wind deflector 112 and the front wall 132 of the transport unit 130. The TRU 140 is generally positioned in the air gap 160.

As shown in FIG. 1B, the TRU 140 is provided at the front wall 132 of the transport unit 130 and includes a housing 142 and a fairing 170 provided on a top side of the TRU 140.

As shown in FIG. 1C, the top side of the TRU 140 also includes a heat exchanger fan 144 at a top end of the TRU 140. The heat exchanger fan 144 is configured to discharge air out of the TRU 140 in a vertically upward direction as shown by arrows 146. The heat exchanger fan 144 shown in FIG. 1C can be an axial fan. In some embodiments, the heat exchanger fan 144 can be a vane axial fan. However, in other embodiments, the heat exchanger fan 144 can be, for example, any type of fan that is configured to discharge air out of the TRU 140 in a vertically upward direction. In some embodiments, the TRU 140 includes two or more heat exchanger fans 144.

The TRU 140 also includes the fairing 170. The fairing 170 is configured to shield airflow from the heat exchanger fan 144 (e.g., heat exchanger airflow) from the adverse effect of wind (e.g., ram air) and to create and/or increase a negative pressure at a heat exchanger fan outlet (not shown) of the TRU 140. In particular, when the refrigerated transport unit 100 is in transport, the fairing 170 can enhance airflow through a condenser coil (not shown), a radiator (not shown) and/or an intercooler (not shown) of the TRU 140, thereby avoiding a high engine coolant temperature and head pressure in the TRS 120 and the accumulation of frost which could lead to an unintended shutdown of the TRU 140. As shown in FIG. 1C, the fairing 170 has an angle A°. The angle A° can be any angle that can shield airflow from the heat exchanger fan 144 from the adverse effect of wind and create and/or increase a negative pressure at a heat exchanger fan outlet of the TRU 140. In some embodiments, the angle A° can be, for example, a value between about 90° and 170°. For example, in one embodiment, the angle A° can be about 118°.

While FIGS. 1A, 1B and 1C show the transport unit 130 as a trailer type transport unit towed by the tractor 110, it is to be understood that the embodiments as described herein can be used with any type of transport unit, including, for example, a trailer (e.g., trailer on flat car, etc.), a container (e.g., container on flat cars, intermodal container, etc.), a truck, a box car, etc.

Figure 2A:
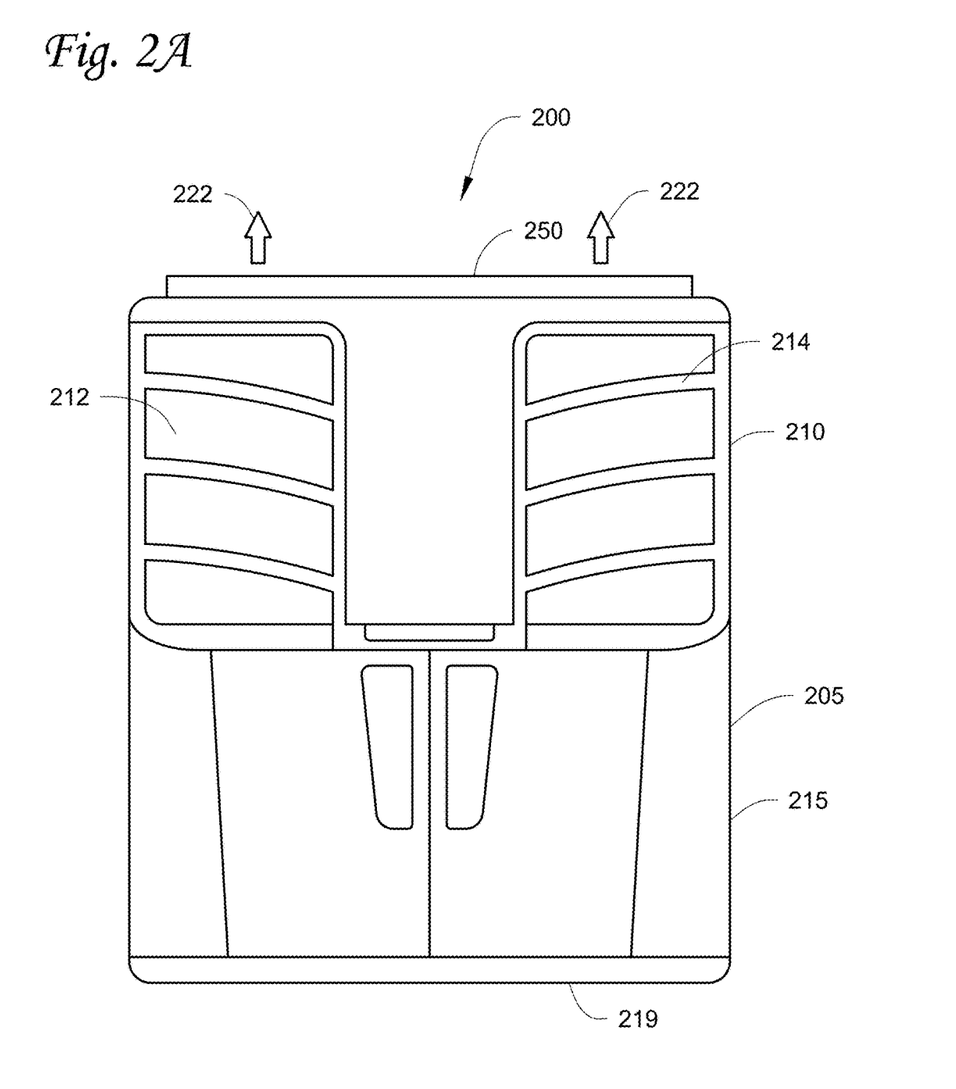
FIG. 2A illustrates a front view of a TRU, according to one embodiment.
Figure 2B:
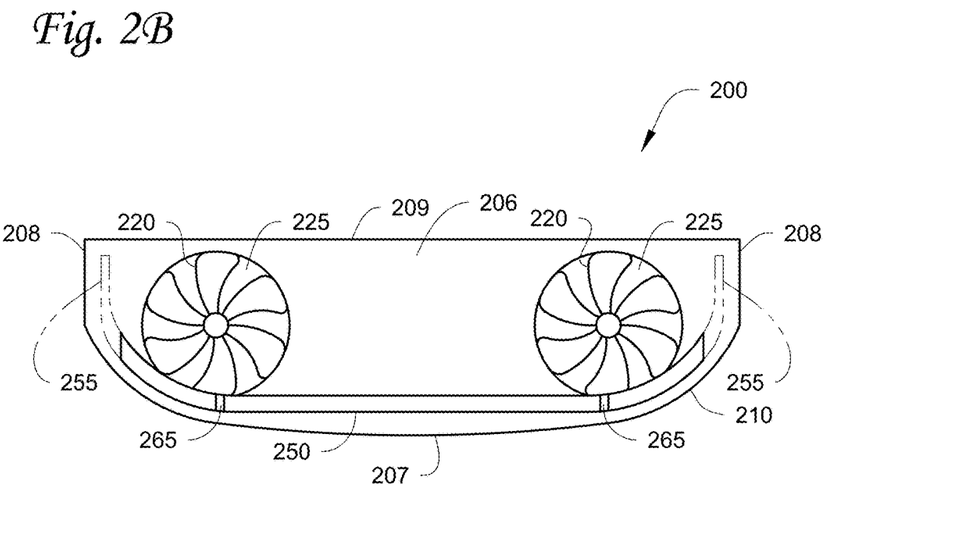
FIG. 2B illustrates a top view of the TRU shown in FIG. 2A, according to one embodiment.

FIGS. 2A and 2B illustrate front and top views of a TRU 200 for a TRS with a fairing 250, with which the embodiments as described herein can be practiced. The TRU 200 is configured to be in communication with an internal space (e.g. the internal space 150 shown in FIG. 1A) and is configured to control an environmental condition in the internal space.

As shown in FIG. 2A, the TRU 200 has a housing 205, which includes a heat exchanger compartment 210 and a lower compartment 215. The heat exchanger compartment 210 is generally positioned above the lower compartment 215. A condenser 212 is positioned inside the heat exchanger compartment 210. The heat exchanger compartment 210 has a guard 214 to enclose the condenser 212. The housing 205 has a bottom 219. The heat exchanger compartment 215 includes at least a portion of the bottom 219 of the TRU 210. The fairing 250 is provided on a top side 206 (see FIGS. 2B-2D) of the housing 205. In some embodiments, the heat exchanger compartment 210 can also house a radiator and/or an intercooler.

In some embodiments, the fairing 250 includes clamping sections 265 (see FIGS. 2B and 2D) for clamping the fairing 250 to the top side 206 of the housing 205. In other embodiments, the fairing 250 can be attached to the top side 206 of the housing 205 via, for example, an adhesive, screw(s), bolts, etc. In yet some other embodiments, the fairing 250 can be molded or integrally formed with the housing 205.

As shown in FIG. 2B, the top side 206 of the housing 205 of the TRU 200 includes two heat exchanger fans 220 with heat exchanger fan outlets 225 and the fairing 250. The heat exchanger fans 220 are configured to discharge air from within the heat exchanger compartment 210 out of the TRU 200 in a vertically upward direction as shown by arrows 222 (see FIG. 2A). While the TRU 200 includes two heat exchanger fans 220, in other embodiments, the TRU 200 can be designed to include only a single heat exchanger fan or three or more heat exchanger fans, based on the desired configuration.

When the TRU 200 is travelling at high speeds (e.g., ~60 mph or greater), high velocity wind (e.g., ram air) is broken and diverted by the fairing 250, preventing and/or mitigating the wind from sweeping over the top of the TRU 200 and the heat exchanger fan outlets 225. That is, when travelling at high speeds, the fairing 250 is configured to enhance heat exchanger airflow through a condenser coil (not shown), a radiator and/or an intercooler of the TRU 200 at a level similar to a level of heat exchanger airflow when the TRU 200 is stationary. The fairing 250 thus can prevent and/or mitigate an increase in the static air pressure at the heat exchanger fan outlets 225 which can negatively affect the performance of the TRU 200. Therefore, the TRU 200 can operate at desired conditions while in transport and during a standstill condition.

The fairing 250 is configured to prevent and/or mitigate static air pressure at the outlet of the heat exchanger fans 220 from creating a loss of airflow to components within the TRU (e.g., a radiator of the TRU) and prevent and/or mitigate the generation of high compressor pressures at an inlet and an outlet of a compressor of the TRU 200. This can prevent and/or mitigate a loss in radiator airflow which could result in an engine of the TRS to overheat, causing the TRS to shut down. Thus, the fairing 250 can enhance the performance of the TRU 200.

Accordingly, the fairing 250 provides a simple, cost-effective and space-efficient solution for enhancing heat exchanger airflow and reducing aerodynamic drag. The angle, shape, and height of the fairing 250 can be optimized to achieve the desired airflow through the condenser coils when the refrigerated transport unit is in transport and/or travelling at high speeds (e.g., 60 mph or faster). This is discussed in more detail below.

The fairing 250 can be configured to have a height high enough to slow and/or divert ram air passing over the heat exchanger fan outlets 225 but not high enough to extend above a height of a transport unit that the TRU 200 is attached to. In some embodiments, the fairing 250 can have a height between about 2 inches and about 4 inches. In some embodiments, the fairing 250 can have a height of about 2.8 inches.

Also, in some embodiments, the fairing 250 can be composed of sheet metal. In other embodiments, the fairing 250 can be composed of a material that can withstand damage from debris (tree limbs, dirt, etc.), weather elements (rain, snow, hail, etc.), or the like. For example, in some embodiments the fairing 250 can be composed of a flexible rubber material or the like.

Figure 2C:
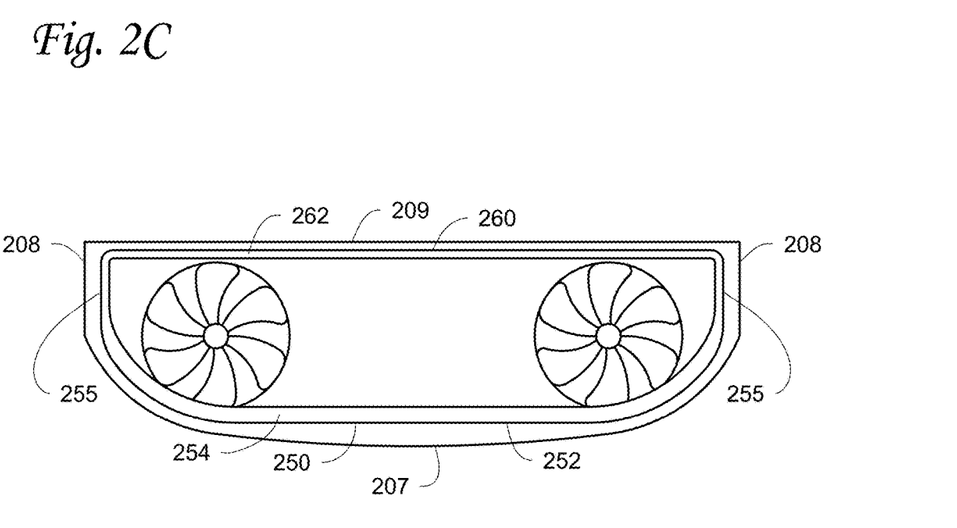
FIG. 2C illustrates a top view of the TRU shown in FIG. 2A, according to another embodiment.

As shown in FIG. 2B, the fairing 250 extends along a front edge 207 of the housing 205. Optionally, as shown by side extended portions 255, the fairing 250 can extend alongside edges 208 of the housing 200. Also, as shown in FIG. 2C, in some embodiments, the fairing 250 can include the side extended portions 255 and a back extended portion 260 that extends along a back edge 209 of the housing 200.

In some embodiments, the fairing 250 can also include a hinge mechanism (not shown) that allows the back extended portion 260 to rotate about a top end 262 of the back extended portion 260. The hinge mechanism can be configured to allow ram air (that is slowed and/or diverted by a front extended portion 252) to push/rotate the back extended portion 260 towards the back edge 209 when the ram air travels in a direction from the front edge 207 towards the back edge 209. The hinge mechanism can also be configured to prevent and/or mitigate ram air (travelling in a direction from the back edge 209 towards the front edge 207) from pushing/rotating the back extended portion 260 towards the front edge 207.

Thus, the back extended portion 260 can slow and/or divert ram air when the ram air is travelling in a direction from the back edge 209 towards the front edge 207, and allow ram air (slowed and/or diverted by the front extended portion 252) to pass through the back extended portion 260 and away from the TRU 200.

Similarly, the fairing 250 can also include a second hinge mechanism (not shown) that allows the front extended portion 252 to rotate about a top end 254 of the front extended portion 252. The second hinge mechanism can be configured to allow ram air (that is diverted and/or slowed by the back extended portion 260) to push/rotate the front extended portion 252 towards the front edge 207 when the ram air travels in a direction from the back edge 209 towards the front edge 207. The second hinge mechanism can also be configured to prevent and/or mitigate ram air (travelling in a direction from the front edge 207 towards the back edge 209) from pushing/rotating the front extended portion 252 towards the back edge 209.

Thus, the front extended portion 252 can divert and/or slow ram air when the ram air is travelling in a direction from the front edge 207 towards the back edge 209, and allow ram air (slowed and diverted by the back extended portion 260) to pass through the front extended portion 252 and away from the TRU 200.

Further, in some embodiments, one or more of the side extended portions 255 can also include a hinge mechanism (not shown) to break and/or divert ram air travelling towards the TRU 200 and allow ram air (slowed and diverted by the fairing 250) to travel away from the TRU 200.

Figure 2D:
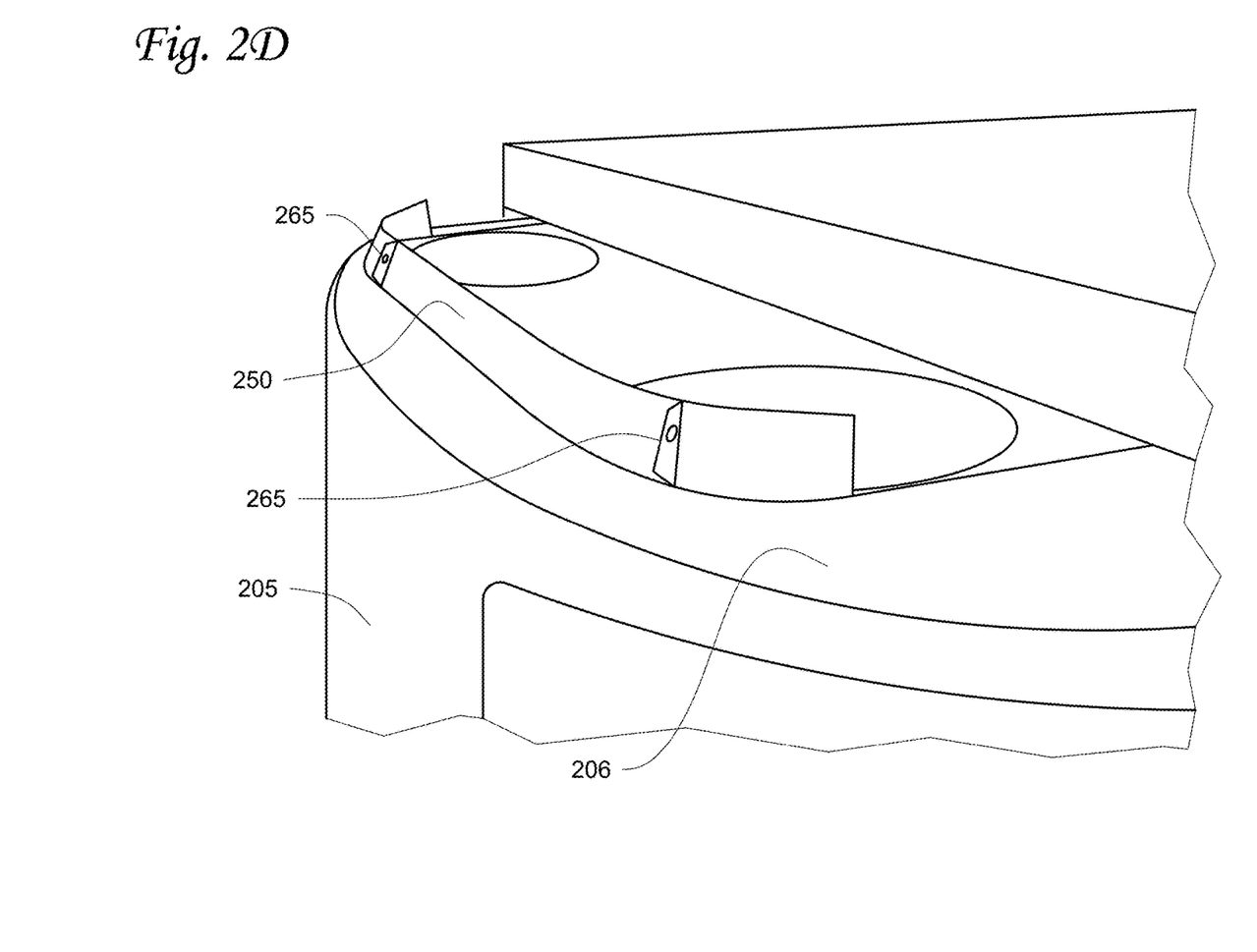
FIG. 2D illustrates a top perspective view of the TRU shown in FIG. 2A, according to one embodiment.

FIG. 2D shows a front perspective view of a top portion of the TRU 200. The fairing 250 includes clamping sections 265 for attaching the fairing 250 to the top side 206 of the housing 205. In other embodiments, the fairing 250 can be attached to the housing 205 via, for example, an adhesive, screw(s), etc.

Experimental Results:

The following is noted with respect to a refrigerated transport unit using a TRU with axial heat exchanger fans and without a fairing.

Figure 3:
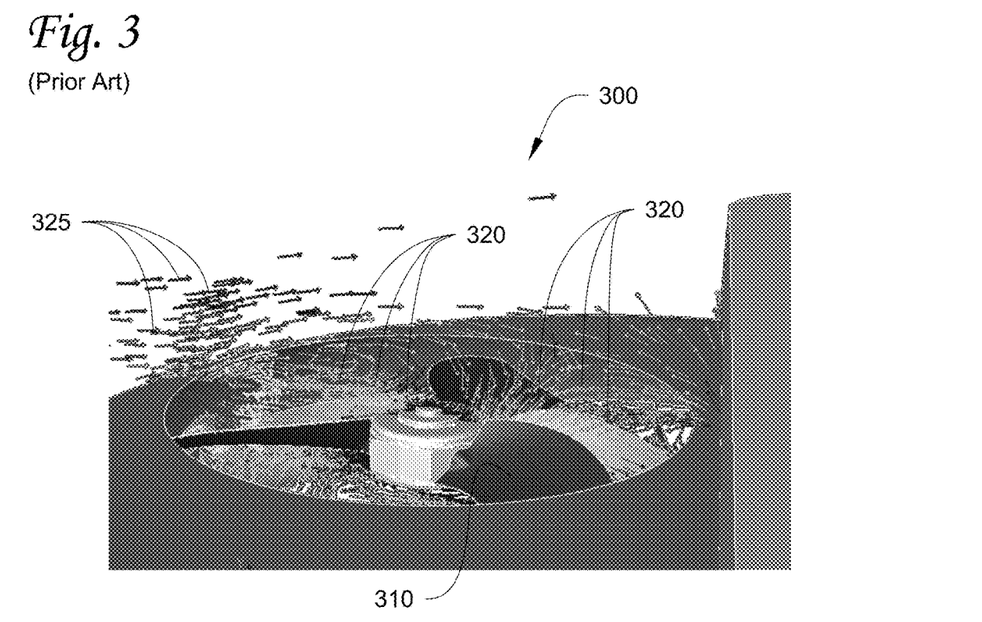
FIG. 3 is a velocity magnitude chart of air flow on top of a prior art TRU when the TRU is travelling at a highway speed.

FIG. 3 is a velocity magnitude chart of air flow over a heat exchanger fan 310 of a prior art TRU 300 when the TRU 300 is travelling at a highway speed. As shown by ram air flow vectors 325, ram air passes over the heat exchanger fan 310 which can create a high pressure at an exit of the heat exchanger fan 310. Accordingly, the heat exchanger fan 310 could struggle to push heat exchanger airflow (shown by heat exchanger airflow vectors 320) up and out of the TRU 300. This reduction in heat exchanger airflow out of the TRU could lead to an increase in radiator water temperature and thereby lead to an engine shutdown.

Figure 4:
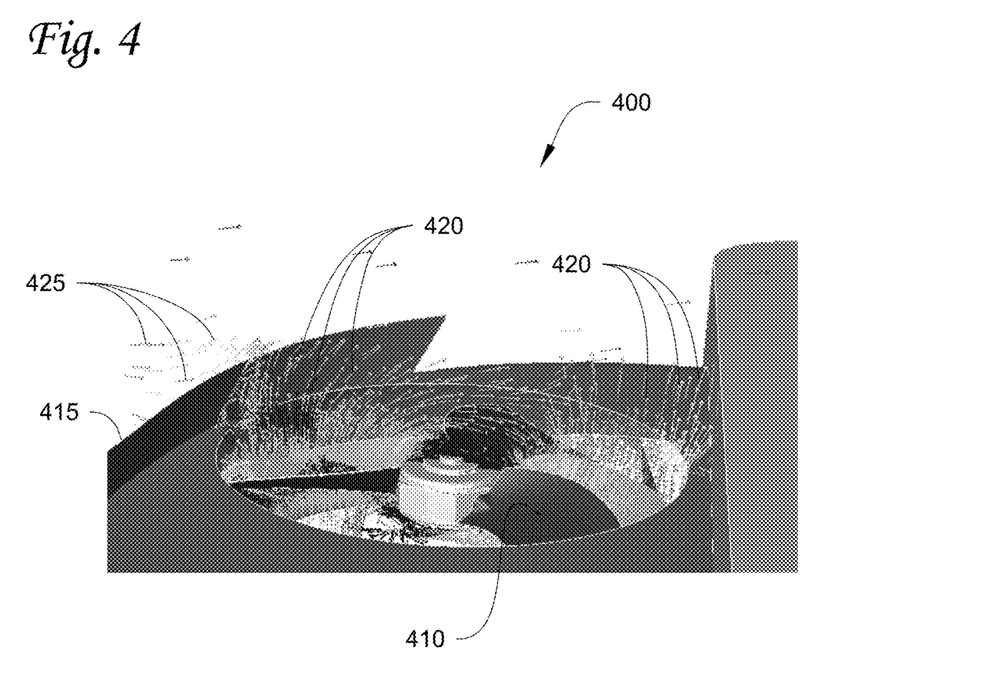
FIG. 4 is a velocity magnitude chart of air flow on top of a TRU with a fairing when the TRU is travelling at a highway speed.

In contrast, as shown in FIG. 4, when a fairing 415 is provided on top of TRU 400, ram air (shown by ram air vectors 425) is blocked and only a limited amount of the ram air can pass over heat exchanger fan 410. Accordingly, the heat exchanger fan 410 can throw heat exchanger airflow (shown by heat exchanger airflow vectors 420) up and out of the TRU 400.

Accordingly, when travelling at highway speeds (e.g., above ~50 mph), the fairing 415 can prevent and/or mitigate a radiator water temperature and a head pressure of the TRU from approaching a maximum operational limit which can occur due to wind (e.g., ram air) moving on top of the TRU, thereby creating high flow distortion with high pressure which dumps air on a delivery side of the heat exchanger fans. Thus, the fairing 415 can prevent and/or mitigate both curbside and roadside heat exchanger fans from struggling to deliver a desired heat exchanger airflow at the required rated condition for operation.

It has been found that when a TRU has a fairing as disclosed herein, the heat exchanger airflow out of the curb side and road side heat exchanger fans can increase when the TRU is travelling at highways speeds over the heat exchanger airflow out of the curb side and road side heat exchanger fans when the TRU is in a standstill condition. For example, in one instance, a ~10% increase in heat exchanger airflow out of the curb side heat exchanger fan was measured when the TRU is travelling at highway speeds versus when the TRU is in a standstill condition. In the same instance, a ~15% increase in heat exchanger airflow out of the road side heat exchanger fan was measured when the TRU is travelling at highway speeds versus when the TRU is in a standstill condition.

When travelling at highway speeds, the fairing as disclosed herein can prevent and/or mitigate the heat exchanger airflow out of the curb side heat exchanger fan from dropping upwards of ~90% from the heat exchanger airflow out of the curb side heat exchanger fan when the TRU is in a standstill condition. Also, when travelling at highway speeds, the fairing as disclosed herein can prevent and/or mitigate the heat exchanger airflow out of the road side heat exchanger fan from dropping upwards of ~85% from the heat exchanger airflow out of the road side heat exchanger fan when the TRU is in a standstill condition Accordingly, the fairing can prevent and/or mitigate a loss in heat exchanger airflow caused by ram air, and thereby prevent and/or mitigate a loss in airflow at a radiator and/or intercooler of the TRU and maintain an adequate negative pressure at a heat exchanger fan outlet. By enhancing airflow at the radiator and/or intercooler and maintaining an adequate negative pressure at a heat exchanger fan outlet, the ram air can be prevented from negatively affecting the performance of the TRU and thereby preventing an engine of the TRS from overheating and/or causing the TRS to shut down.

Figure 5A:
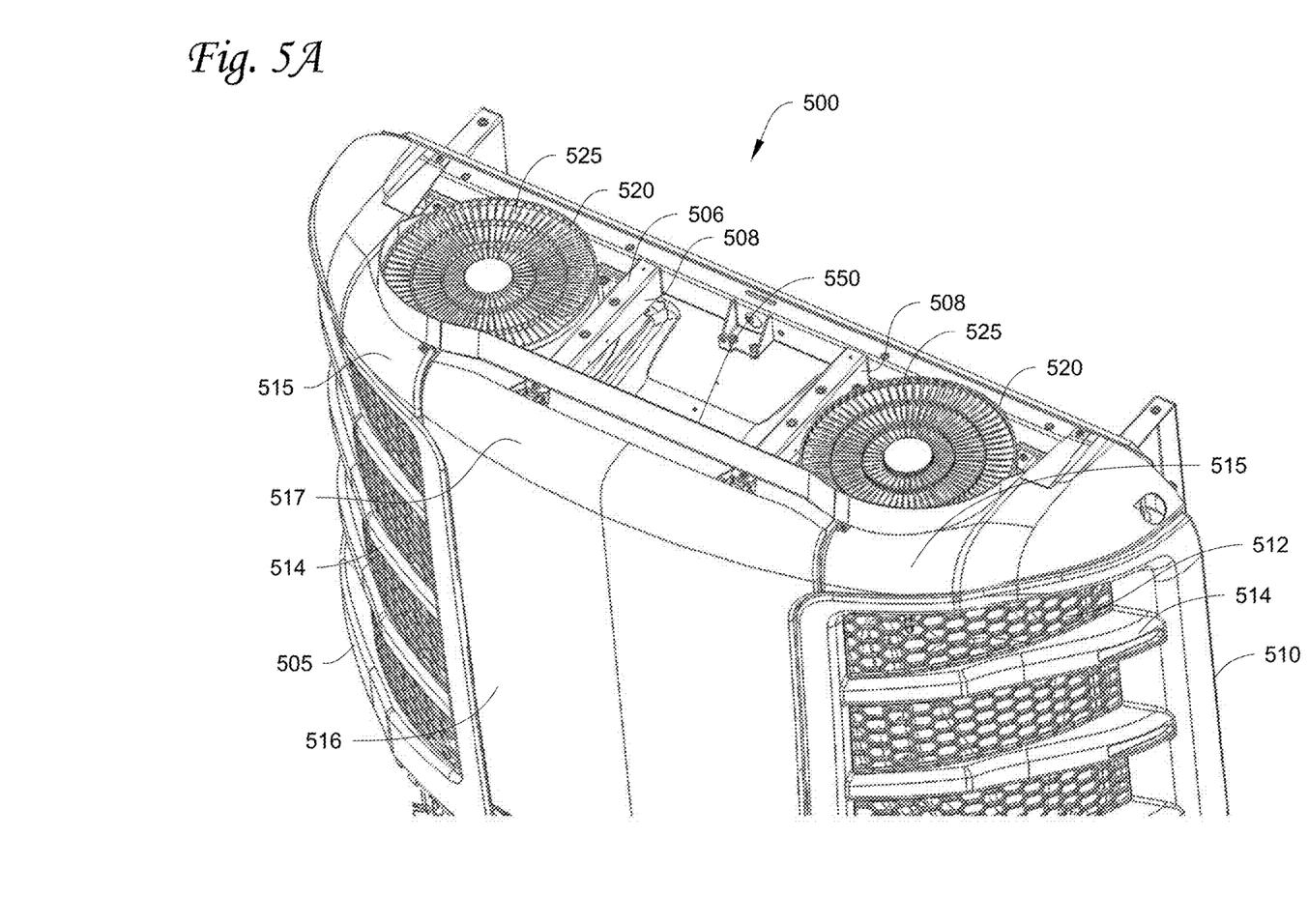
FIG. 5A is a front perspective view of a TRU with a fairing according to another embodiment.
Figure 5B:
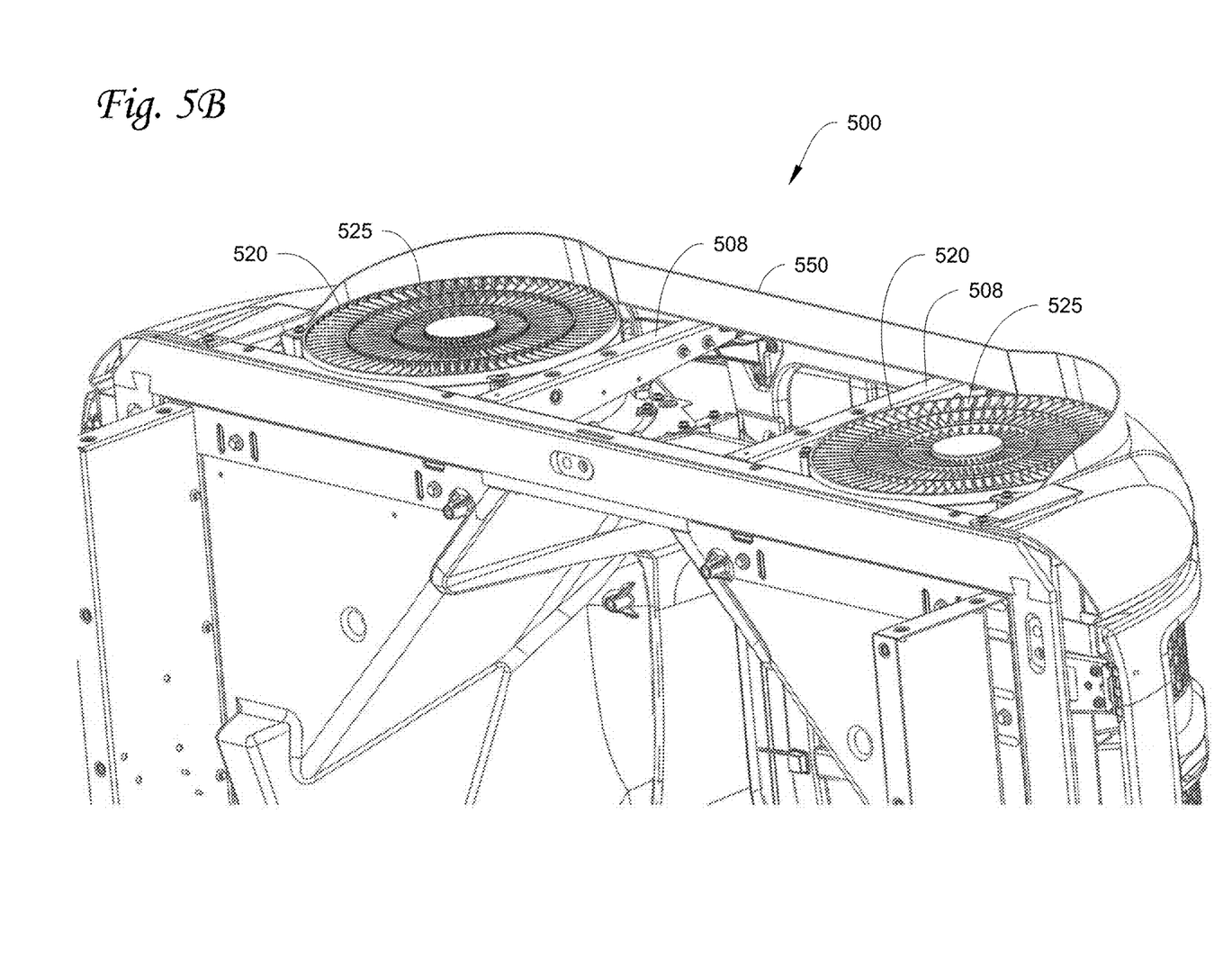
FIG. 5B is a rear perspective view of the TRU and the fairing shown in FIG. 5A.
Figure 6:
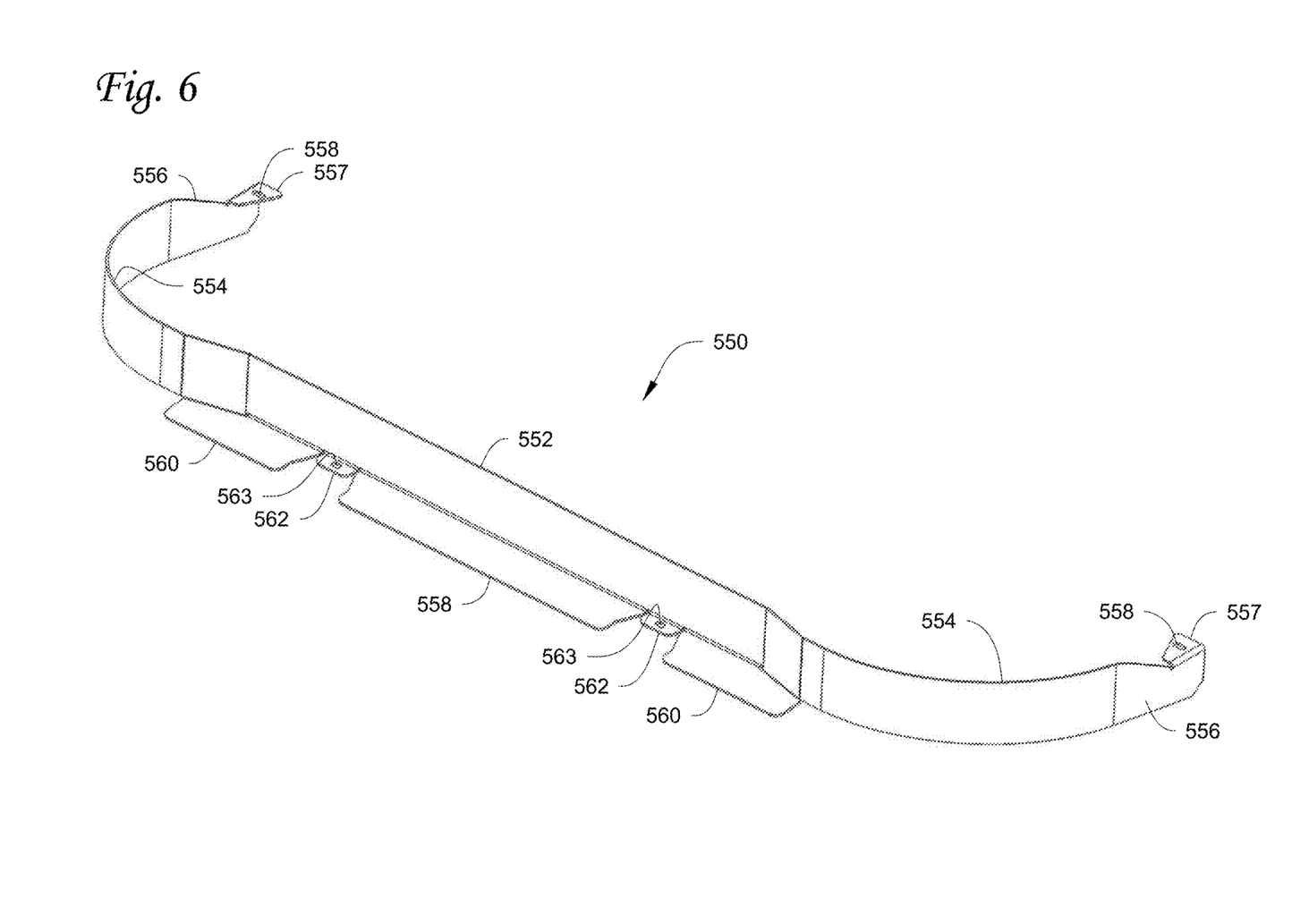
FIG. 6 is a front perspective view of the fairing shown in FIGS. 5A-B.

FIGS. 5A, 5B and 6 illustrate a fairing 550 according to another embodiment. FIGS. 5A and 5B illustrate front and back perspective views of a TRU 500 for a TRS with the fairing 550. The TRU 500 is configured to be in communication with an internal space (e.g. the internal space 150 shown in FIG. 1A) and is configured to control an environmental condition in the internal space.

As shown in FIG. 5A, the TRU 500 has a housing 505, which includes a heat exchanger compartment 510 and a lower compartment (not shown). The heat exchanger compartment 510 is generally positioned above the lower compartment. A condenser 512 is positioned inside the heat exchanger compartment 510. The heat exchanger compartment 510 has two guard sections 514 to enclose the condenser 512 and a door section 516 disposed between the guard sections 514. The fairing 550 is provided on a top side 506 of the housing 505. In some embodiments, the heat exchanger compartment 510 can also house a radiator and/or an intercooler.

As shown in FIG. 6, the fairing 550 includes a center section 552, two curved sections 554 at opposite ends of the center section 552, and two end sections 556 at opposite ends of the fairing 550. The fairing 550 also includes a center flap 558, two side flaps 560 at opposite ends of the center section 552, and two attachment flaps 562 each disposed between one of the side flaps 560 and the center flap 558. The flaps 558, 560, 562 extend from a bottom edge of the center section 552 in a direction generally perpendicular to the center section 552 and are configured to rest on a top side 506 of the housing 505.

The two curved sections 556 are configured to curve around heat exchanger fan outlets 525 of the heat exchanger fans 520. The center section 552 is disposed to be generally in back of the door section 516. Accordingly, the fairing 550 does not interfere with the door section 516 when it is opened or closed.

Each of the end sections 556 includes an attachment bracket 557 that has an aperture 558. The attachment brackets 557 with the apertures 558 allow the fairing 550 to be attached to the top side 506 of the housing 505 via an attachment fastener (e.g., a bolt, a screw, an adhesive, etc.). In some embodiments, the attachment brackets 557 with the apertures 558 can allow the fairing 550 to be attached to the heat exchanger fan outlets 525. Also, as shown in FIG. 6, a height of the end sections 556 is gradually reduced from a side of the end sections 556 adjacent to the curved sections 554 to a side of the end sections 556 at the ends of the fairing 550.

The attachment flaps 562 are configured to rest on posts 508 of the housing 505. Each of the attachment flaps 562 also includes an aperture 563 that allows the attachment flap 562 to be attached to the post 508 via an attachment fastener (e.g., a bolt, a screw, an adhesive, etc.). The center flap 558 is configured to rest underneath an upper lip 517 of the door section 516 disposed at the top side 506. Each of the side flaps 560 is configured to rest under a respective upper lip 515 of the guard sections 514.

The heat exchanger fans 520 are configured to discharge air from within the heat exchanger compartment 510 out of the TRU 500 in a vertically upward direction. While the TRU 500 includes two heat exchanger fans 520, in other embodiments, the TRU 500 can be designed to include only a single heat exchanger fan or three or more heat exchanger fans, based on the desired configuration.

When the TRU 500 is travelling at high speeds (e.g., ~60 mph or greater), high velocity wind (e.g., ram air) can be broken and diverted by the fairing 550, preventing and/or mitigating the wind from sweeping over the top of the TRU 500 and the heat exchanger fan outlets 525. That is, when travelling at high speeds, the fairing 550 is configured to enhance heat exchanger airflow through a condenser coil (not shown), a radiator and/or an intercooler of the TRU 500 at a level similar to a level of heat exchanger airflow when the TRU 500 is stationary. The fairing 550 thus can prevent and/or mitigate an increase in the static air pressure at the heat exchanger fan outlets 525 which can negatively affect the performance of the TRU 500. Therefore, the TRU 500 can operate at desired conditions while in transport and during a standstill condition.

The fairing 550 is configured to prevent and/or mitigate static air pressure at the outlet of the heat exchanger fans 520 from creating a loss of airflow to components within the TRU (e.g., a radiator of the TRU) and prevent and/or mitigate the generation of high compressor pressures at an inlet and an outlet of a compressor of the TRU 500. This can prevent and/or mitigate a loss in radiator airflow which could result in an engine of the TRS to overheat, causing the TRS to shut down. Thus, the fairing 550 can enhance the performance of the TRU 500.

Accordingly, the fairing 550 provides a simple, cost-effective and space-efficient solution for enhancing heat exchanger airflow and reducing aerodynamic drag. As discussed above with respect to the fairing 250 shown in FIGS. 2A-2D, the angle, shape, and height of the fairing 550 can be optimized to achieve the desired airflow through the condenser coils when the refrigerated transport unit is in transport and/or travelling at high speeds (e.g., 60 mph or faster). This is discussed in more detail below.

The fairing 550 can be configured to have a height high enough to slow and/or divert ram air passing over the heat exchanger fan outlets 525 but not high enough to extend above a height of a transport unit that the TRU 500 is attached to. In some embodiments, the fairing 550 can have a maximum height at the center section 552 between about 2 inches and about 4 inches. In some embodiments, the fairing 550 can have a maximum height at the center section 552 of about 2.8 inches.

Also, in some embodiments, the fairing 550 can be composed of sheet metal. In other embodiments, the fairing 550 can be composed of a material that can withstand damage from debris (tree limbs, dirt, etc.), weather elements (rain, snow, hail, etc.), or the like. For example, in some embodiments the fairing 550 can be composed of a flexible rubber material or the like.

It is appreciated that the above embodiments are non-limiting. In some embodiments, the fairing can be, for example, fastened or welded to a top side of the TRU via an attachment mechanism (not shown). In some embodiments, the attachment mechanism can be an injection molded piece configured to attach the fairing to the top side of the TRU. The injection molded piece can be composed of a stiff material such as, for example, nylon, acrylonitrile butadiene styrene (ABS), etc. In other embodiments, the attachment mechanism can be a piece of sheet metal shaped to attach to the fairing at first portion and to attach to the top side of the TRU at a second portion. In some embodiments, the attachment mechanism can attach to the fairing and the top side of the TRU via a fastener (e.g., an adhesive, a bolt, a screw, etc.). The attachment mechanism is configured to secure the fairing held tight to the top side of the TRU so as to withstand vibration, air pressure, weather related factors (temperature, ice, wind, snow, rain, etc.), environmental related factors (oncoming trees, dirt, etc.). In some embodiments, the attachment mechanism may be a bracket. Also, in some embodiments, two or more attachment mechanisms disposed at different locations between the fairing and the top side of the TRU may be used to secure the fairing to the top side of the TRU.

In some embodiments, the fairing can include three or more separate and attachable portions that can be attached via a butt joint.

In some embodiments, the fairing can be a rear mounted fairing that is configured to attach to a rear edge of the top side of the TRU and hang over a top side of the TRU. In these embodiments, the fairing can include a ventilated top portion configured to allow heat exchanger airflow to travel vertically upward and out of the TRU, and include a front portion that extends downwardly from the ventilated top portion and is configured to divert ram air from passing over the heat exchanger fan outlet.

In some embodiments, the faring may include one or more vortex generators attached to the main body of the fairing. The vortex generator(s) can be a small vane that creates a vortex to delay flow separation of, e.g., either the ram air attempting to pass over the heat exchanger fan outlet and/or the heat exchanger airflow being directed out of the top side of the TRU. Accordingly, the vortex generator(s) can be provided on an internal surface (facing the heat exchanger fan airflow) or an external surface (facing the oncoming ram air) of the fairing.

In some embodiments, the fairing may be shaped so as to curve around a single heat exchanger fan outlet. In these embodiments, two or more fairings may be provided to surround each of the heat exchanger fan outlets. In some of these embodiments, the fairing may gradually decrease in height from a center portion of the fairing to the ends of the fairings.

In some embodiments, the fairing can be integrated with a fan cover of the heat exchanger fan. For example, in some of these embodiments, the fairing can be molded into the fan cover.

In some embodiments, each end of the fairing may include a spring force mechanism hinged to the top side of the TRU. In some of these embodiments, the spring force mechanisms can be configured to raise or close the fairing from the top side of the TRU. For example, in some embodiments, the spring force mechanisms can be actuated so as to raise the fairing to allow a door section of the TRU to open without interference from the fairing. In these embodiments, the fairing may be raised, for example, about two inches. In some embodiments, the fairing can be attached to the top side of the TRU via a pivoting mechanism that is configured to pivotably raise and close the fairing from the top side of the TRU. In some of these embodiments, the pivoting mechanism can be electrically controlled.

In some embodiments, the fairing may include a pivoting mechanism that is configured to increase or decrease the angle of the fairing to the top side of the TRU. In some of these embodiments, the pivoting mechanism can be electrically controlled.

In some embodiments, the fairing may be molded into the housing (e.g., skins) of the TRU. In other embodiments, a seal or gasket can be used to provide a smooth transition from the fairing to the top side of the TRU. Accordingly, ram air can be prevented from passing over the heat exchanger fan outlet by passing underneath a bottom of the fairing. In some embodiments, the seal or gasket can be composed of rubber.

In some embodiments, the fairing may be configured such that a center section of the fairing can retract or slide away from a center portion of the top side of the TRU. Accordingly, when the center section of the fairing is retracted away from the center portion, a door section of the TRU can be opened without interference from the fairing.

In some embodiments, the fairing can be composed of one or more slider panels to slide into and out of a top side of the TRU. In some embodiments, the fairing can be composed of one or more panels that can be snap fitted together or onto a top side of the TRU.

In some embodiments, the fairing can include one or more extrusion wings at the ends of the fairing. The extrusion wings can be configured to prevent environmental conditions (e.g., tree limbs) from hitting the fairing during transport. In some embodiments, the wing extrusion(s) can be attached to the fairing with, for example, a rivet, a screw, a pin, a magnet, an adhesive, etc. In some embodiments, the extrusion wing(s) can be composed of a rubber material. In some embodiments, the wing extrusions may include a clip portion that is configured to attach to a stator portion of the heat exchanger fan outlet.

In some embodiments, ram air can be diverted from the heat exchanger fan outlets via an adjustable shutter provided on a stator of the heat exchanger fan outlet. The shutter can be opened or closed as required to allow shutter blades of the shutter to diver ram air from passing over the heat exchanger fan outlet. In some embodiments, air baffles can be placed on the stator of the heat exchanger fan outlet so as to face a direction away from incoming ram air (e.g., toward the transport unit) in order to create a low pressure region above the heat exchanger fan outlet. Accordingly, heat exchanger airflow out of the heat exchanger fan outlet can be enhanced. In some embodiments, the air baffles can be circular shaped air baffles. In some embodiments, an orifice can be provided to surround the heat exchanger fan outlet in combination with the shutter and/or air baffles. In some embodiments, the orifice can be about a 2 inch high orifice.

In some embodiments, one or more air ducts can be provided at a top side of the TRU. The air duct(s) can be configured to receive ram air attempting to pass over the heat exchanger fan outlet and diver the ram air away from the heat exchanger fan outlet.

In some embodiments, heat exchanger fan airflow can be enhanced by adjusting an angle of the heat exchanger fan so as to direct the heat exchanger fan airflow out of the TRU at an angle away from a direction of the oncoming ram air attempting to pass over the heat exchanger fan outlet.

Aspects:

It is noted that any of the features in aspects 1-8, 9-16, 17 and 18 below can be combined.

Aspect 1. A transport refrigeration unit (TRU) attached to a transport unit, the TRU comprising:
a housing having a top side;
a heat exchanger fan configured to discharge air from within the housing, the heat exchanger fan including a heat exchanger fan outlet disposed on the top side of housing; and
a fairing disposed on the top side of the housing and extending from the top side of the housing, the fairing configured to divert ram air passing over the heat exchanger fan outlet during transport of the transport unit.

Aspect 2. The TRU of aspect 1, wherein the fairing is disposed on the top side of the housing so as to surround a portion of the heat exchanger fan outlet.

Aspect 3. The TRU of any of aspects 1 or 2, wherein the fairing is configured to have a height sufficient to divert ram air passing over the heat exchanger outlet fan but not extend above a height of the transport unit.

Aspect 4. The TRU of any of aspects 1-3, wherein the fairing is composed of sheet metal.

Aspect 5. The TRU of any of aspects 1-4, wherein the fairing is composed of rubber.

Aspect 6. The TRU of any of aspects 1-5, wherein the height of the fairing is between 2 to 4 inches.

Aspect 7. The TRU of any of aspects 1-6, wherein the fairing is configured to extend from the top side of the housing at an angle A°, wherein the angle A° is between 90° and 170°.

Aspect 8. The TRU of any of aspects 1-7, wherein the housing of the TRU includes a front side configured to face a direction away from the transport unit, and wherein the fairing is disposed on the top side adjacent a front edge of the TRU between the top side and the front side of the housing.

Aspect 9. A refrigerated transport unit, comprising:
a transport unit;
a transport refrigeration unit (TRU) attached to a side of the transport unit, the TRU including:
a housing having a top side,
a heat exchanger fan configured to discharge air from within the housing, the heat exchanger fan including a heat exchanger fan outlet disposed on the top side of housing, and
a fairing disposed on the top side of the housing and extending from the top side of the housing, the fairing configured to divert ram air passing over the heat exchanger fan outlet during transport of the transport unit.

Aspect 10. The refrigerated transport unit of aspect 9, wherein the fairing is disposed on the top side of the housing so as to surround a portion of the heat exchanger fan outlet.

Aspect 11. The refrigerated transport unit of any of aspects 9 or 10, wherein the fairing is configured to have a height sufficient to divert ram air passing over the heat exchanger outlet fan but not extend above a height of the transport unit.

Aspect 12. The refrigerated transport unit of any of aspects 9-11, wherein the fairing is composed of sheet metal.

Aspect 13. The refrigerated transport unit of any of aspects 9-12, wherein the fairing is composed of rubber.

Aspect 14. The refrigerated transport unit of any of aspects 9-13, wherein the height of the fairing is between 2 to 4 inches.

Aspect 15. The refrigerated transport unit of any of aspects 9-14, wherein the TRU is attached to a front side of the transport unit and the fairing is configured to extend from the top side of the housing at an angle A°, wherein the angle A° is between 90° and 170° from the front side of the transport unit.

Aspect 16. The refrigerated transport unit of any of aspects 9-15, wherein the housing of the TRU includes a front side configured to face a direction away from the transport unit, and wherein the fairing is disposed on the top side adjacent a front edge of the TRU between the top side and the front side of the housing.

Aspect 17. A method of enhancing heat exchanger airflow out of a transport refrigeration unit (TRU), the method comprising:
discharging air, via a heat exchanger fan, from within the TRU in a generally vertical direction out of the TRU; and
diverting ram air attempting to pass over a heat exchanger fan outlet, via a fairing disposed on a top side of the TRU, in a direction away from the heat exchanger fan outlet.

Aspect 18. A fairing for a transport refrigeration unit (TRU), the fairing comprising:
a center section;
a curved section at one end of the center section, wherein the curved section is configured to surround a portion of a heat exchanger fan outlet; and
wherein the fairing is configured to divert ram air passing over the heat exchanger fan outlet during transport of the TRU.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A transport refrigeration unit (TRU) attached to a transport unit, the TRU comprising:
a housing having a top side, wherein the top side faces a direction that is perpendicular to a travelling direction of the transport unit;
a heat exchanger fan configured to discharge air from within the housing, the heat exchanger fan including a heat exchanger fan outlet disposed on the top side of housing and protruding out of the top side of the housing, wherein the heat exchanger fan outlet is configured to direct air from within the housing to out of the housing in a direction perpendicular to a travelling direction of the transport unit; and
a fairing that includes a center section disposed on the top side of the housing at a location that faces the direction that is perpendicular to the travelling direction of the transport unit and extends away from the top side-of the housing, the fairing configured to divert ram air passing over the heat exchanger fan outlet during transport of the transport unit and configured to mitigate an increase in static air pressure at the heat exchanger fan outlet,
wherein the housing includes a heat exchanger compartment having a door section with a door for providing access inside the housing, the door section being provided on a front side of the housing, wherein the door section includes an upper lip that extends over a portion of the top side of the housing that faces the direction that is perpendicular to the travelling direction of the transport unit, and wherein the center section of the fairing is positioned on the top side of the housing at the location that faces the direction that is perpendicular to the travelling direction of the transport unit in back of the door section so as to not interfere with the door section when the door is opened.

2. The TRU of claim 1, wherein the fairing is disposed on the top side of the housing so as to surround a portion of the heat exchanger fan outlet.

3. The TRU of any of claim 1, wherein the fairing is configured to have a height sufficient to divert ram air passing over the heat exchanger outlet fan but not extend above a height of the transport unit.

4. The TRU of claim 1, wherein the fairing is composed of sheet metal.

5. The TRU of claim 1, wherein the fairing is composed of rubber.

6. The TRU of claim 1, wherein the height of the fairing is between 2 to 4 inches.

7. The TRU of claim 1, wherein the fairing is configured to extend from the top side of the housing at an angle A°, wherein the angle A° is between 90° and 170° from a front side of the TRU to a rear side of the TRU.

8. The TRU of claim 1, wherein the housing of the TRU includes a front side configured to face a direction away from the transport unit, and wherein the fairing is disposed on the top side adjacent a front edge of the TRU between the top side and the front side of the housing.

9. The TRU of claim 1, wherein the fairing includes a center section, a first curved section at a first end of the center section, and a second curved section at a second end of the center section, wherein the first curved section is configured to curve around the heat exchanger fan outlet and the second curved section is configured to curve around a second heat exchanger fan outlet, and wherein the center section is disposed on the top side of the housing in back of a door section of the housing.

10. The TRU of claim 1, wherein the fairing includes a plurality of flaps extending from a bottom edge of the fairing and configured to rest on a top side of the housing.

11. A refrigerated transport unit, comprising:

a transport unit;

a transport refrigeration unit (TRU) attached to a side of the transport unit, the TRU including:

a housing having a top side, wherein the top side faces a direction that is perpendicular to a travelling direction of the transport unit, a heat exchanger fan configured to discharge air from within the housing, the heat exchanger fan including a heat exchanger fan outlet disposed on the top side of housing and protruding out of the top side of the housing, wherein the heat exchanger fan outlet is configured to direct air from within the housing to out of the housing in a direction perpendicular to a travelling direction of the transport unit, and a fairing that includes a center section disposed on the top side of the housing at a location where the top side faces the direction that is perpendicular to the travelling direction of the transport unit and extends away from the top side of the housing, the fairing configured to divert ram air passing over the heat exchanger fan outlet during transport of the transport unit and configured to mitigate an increase in static air pressure at the heat exchanger fan outlet, wherein the housing includes a heat exchanger compartment having a door section with a door for providing access inside the housing, the door section being provided on a front side of the housing, wherein the door section includes an upper lip that extends over a portion of the top side of the housing that faces the direction that is perpendicular to the travelling direction of the transport unit, and wherein the center section of the fairing is positioned on the top side of the housing at the location that faces the direction that is perpendicular to the travelling direction of the transport unit in back of the door section so as to not interfere with the door section when the door is opened.

12. The refrigerated transport unit of claim 11, wherein the fairing is disposed on the top side of the housing so as to surround a portion of the heat exchanger fan outlet.

13. The refrigerated transport unit of claim 11, wherein the fairing is configured to have a height sufficient to divert ram air passing over the heat exchanger outlet fan but not extend above a height of the transport unit.

14. The refrigerated transport unit of claim 11, wherein the fairing is composed of sheet metal.

15. The refrigerated transport unit of claim 11, wherein the fairing is composed of rubber.

16. The refrigerated transport unit of any of claim 11, wherein the height of the fairing is between 2 to 4 inches.

17. The refrigerated transport unit of any of claim11, wherein the TRU is attached to a front side of the transport unit and the fairing is configured to extend from the top side of the housing at an angle A°, wherein the angle A° is between 90° and 170° from the front side of the transport unit to a rear side of the transport unit.

18. The refrigerated transport unit of any of claim 11, wherein the housing of the TRU includes a front side configured to face a direction away from the transport unit, and wherein the fairing is disposed on the top side adjacent a front edge of the TRU between the top side and the front side of the housing.

19. The refrigerated transport unit of claim 11, wherein the fairing includes a center section, a first curved section at a first end of the center section, and a second curved section at a second end of the center section, wherein the first curved section is configured to curve around the heat exchanger fan outlet and the second curved section is configured to curve around a second heat exchanger fan outlet, and wherein the center section is disposed on the top side of the housing in back of a door section of the housing.

20. The TRU of claim 11, wherein the fairing includes a plurality of flaps extending from a bottom edge of the fairing and configured to rest on a top side of the housing.

* * * * *